350-3.79 SR

XR 3,903,360

United Stat

Kamisaka et al. .

[11] 3,903,360

[45] Sept. 2, 1975

[54] REDUCTION BY POLARIZATION NOISE TECHNIQUES

[75] Inventors: Kosey Kamisaka, Hirakata; Makoto Kato, Nagaokakyo, both of Japan

[73] Assignee: Matsushita Electric Industrial Co., Ltd., Kadoma, Japan

[22] Filed: Oct. 5, 1973

[21] Appl. No.: 403,818

[30] Foreign Application Priority Data

Oct. 9, 1972 Japan .............................. 47-101309
Oct. 24, 1972 Japan .............................. 47-106926

[52] U.S. Cl. ........ 178/6.7 A; 350/3.5; 179/100.3 K; 179/100.3 G; 340/173 LM

[51] Int. Cl. ............................................ G02b 27/10

[58] Field of Search .......... 178/6.7 A; 350/3.5, 152; 179/100.3 G, 100.3 K; 340/173 LT, 173 LM

[56] References Cited

UNITED STATES PATENTS

| | | | |
|---|---|---|---|
| 2,527,463 | 10/1950 | Sziklai | 179/100.3 K |
| 3,407,272 | 10/1968 | Barocela | 179/100.3 K |
| 3,502,888 | 3/1970 | Stites | 350/152 |
| 3,513,268 | 5/1970 | John | 179/100.3 K |
| 3,624,286 | 11/1971 | Bosomworth | 178/6.7 A |
| 3,720,453 | 3/1973 | Lee | 350/3.5 |
| 3,739,093 | 6/1973 | Kanazawa | 350/3.5 |

*Primary Examiner*—Bernard Konick
*Assistant Examiner*—Alan Faber
*Attorney, Agent, or Firm*—Stevens, Davis, Miller & Mosher

[57] ABSTRACT

An apparatus for recording and reproducing signals in which a reference flux of coherent light and each of two kinds of fluxes of light separated from the reference flux of light are interfered with one another so as to form a multiple recording through a slit on a moving recording medium, and fluxes of reproduction light diffracted from said multiple recorded medium are individually converted into electrical signals which are then electrically superposed to give a time series signal.

4 Claims, 12 Drawing Figures

3903360
NO OR CLASSIF

REDUCTION BY POLARIZATION NOISE TECHNIQUES

This invention relates to an apparatus for optically recording and reproducing time series signals.

An object of this invention is to provide an apparatus for recording and reproducing signals characterized in that a reference flux of coherent light and each of two kinds of fluxes of light separated from the reference flux of light are interfered with one another so as to form a multiple recording through a slit on a moving recording medium, and fluxes of reproduction light diffracted from said multiple recorded medium are individually converted into electrical signals which are then electrically superposed to give a time series signal, whereby the signal may be reproduced which has noise eliminated and has larger amplitude as compared with the dynamic range.

In accordance with this invention, various noises caused by cuts, dust, stains and the like on a recording medium can be eliminated and, therefore, it is made possible to reproduce signals with high fidelity. Similar effects can be obtained for the variation in a light source intensity. Further, of course, similar effects can be obtained not only for recording through a single channel but also for multiple recording through a plurality of channels.

Figures 1, 2:
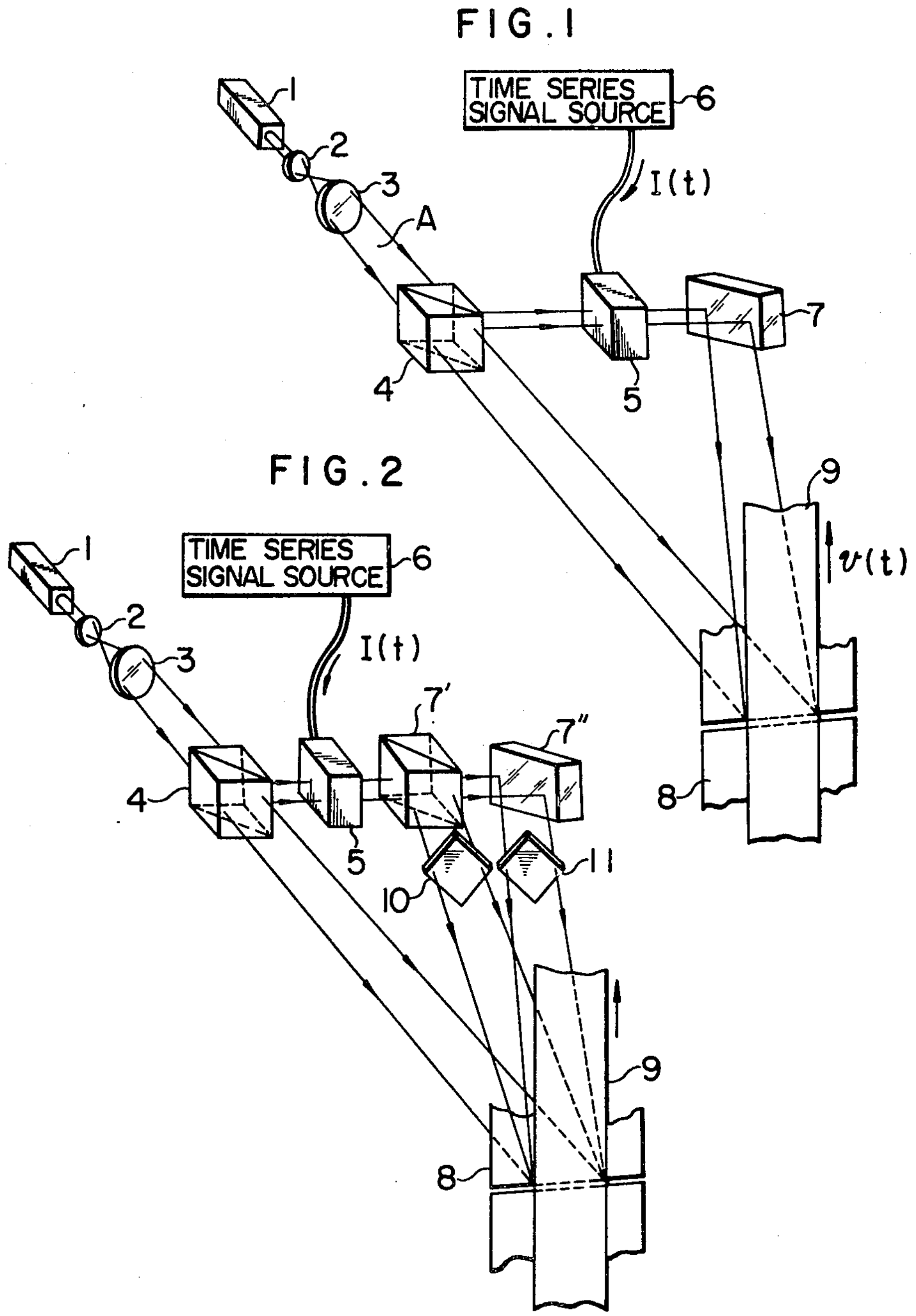
Figure 3:
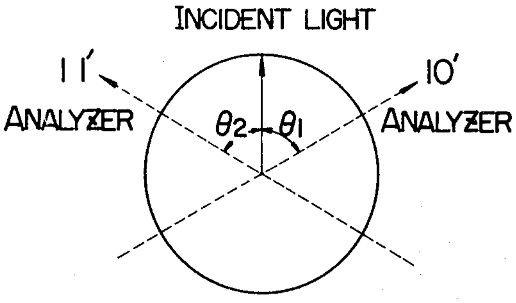
Figure 4:
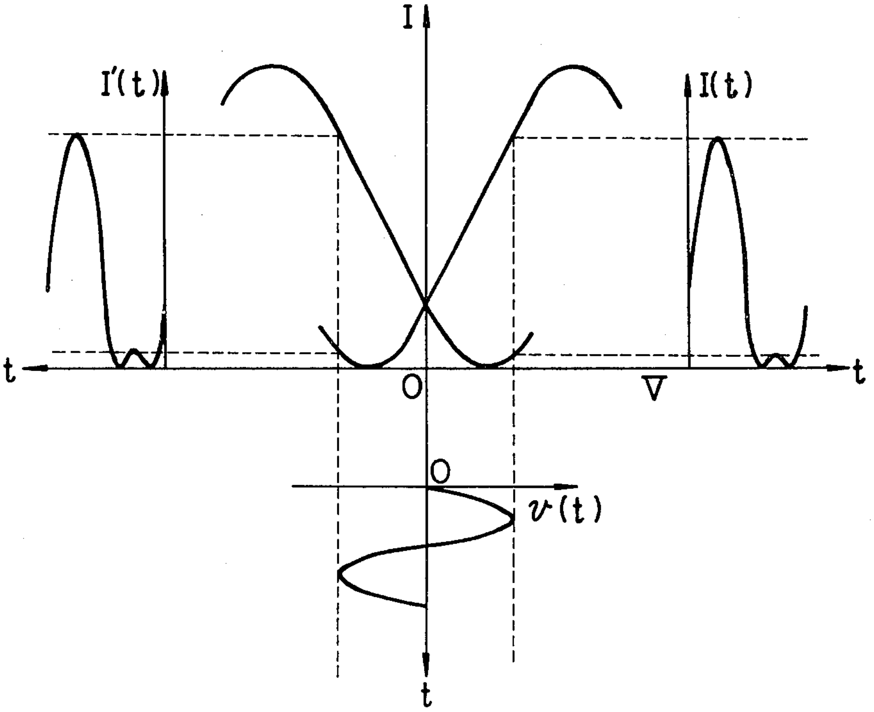

The above and other features and advantages of this invention will be apparent from the following detailed description taken in conjunction with the accompanying drawings, in which:

FIG. 1 is a block diagram of an apparatus for recording signals according to the prior art, FIG. 2 is a block diagram of an embodiment of an apparatus for recording signals according to this invention, FIGS. 3 and 4 are graphs for explaining the operation of the embodiment in FIG. 2.

Figure 5:
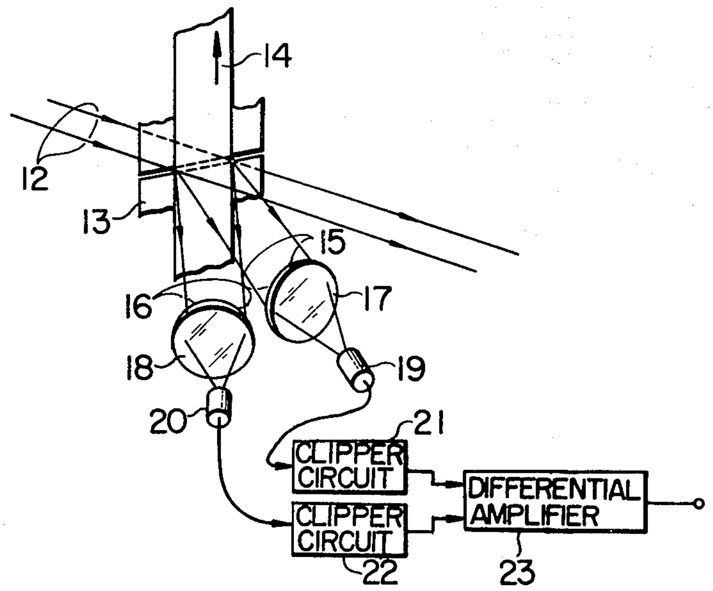
Figure 6:
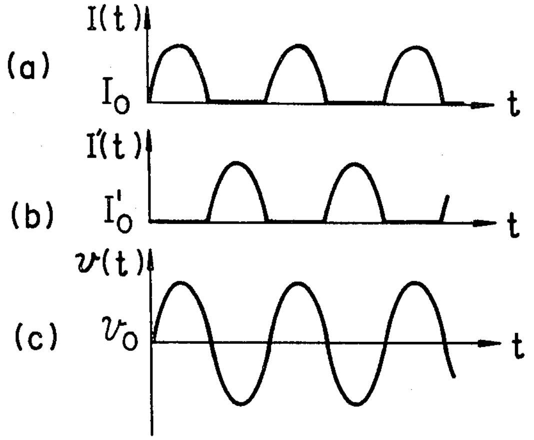
Figure 7:
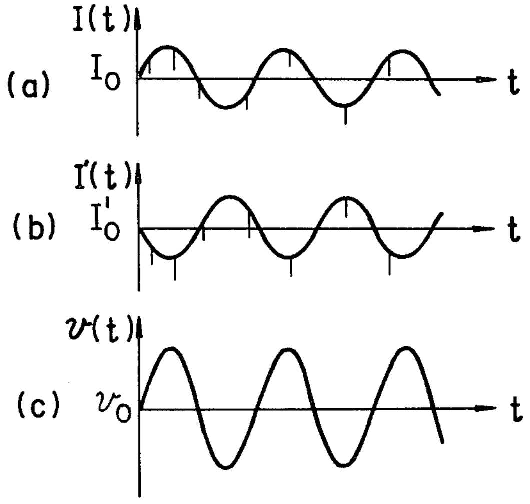
Figures 8, 9:
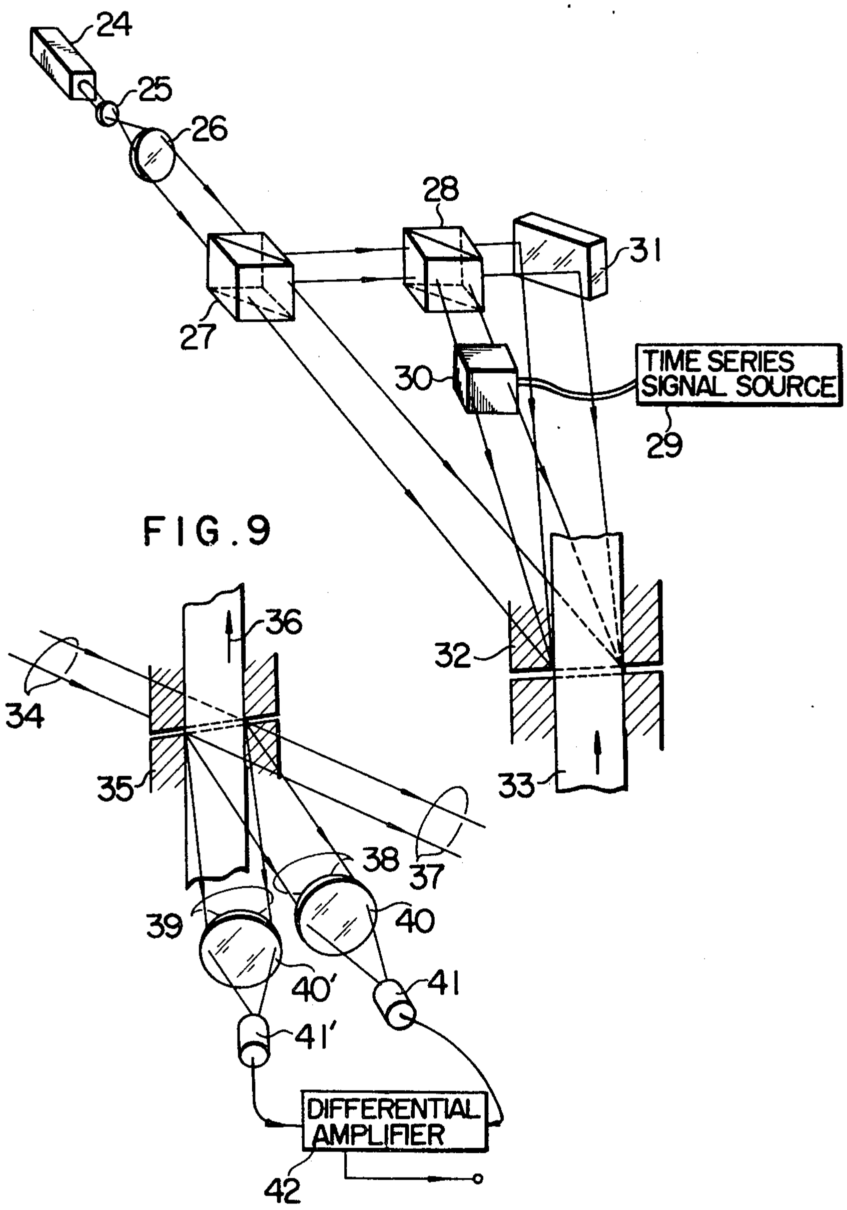
Figure 10:
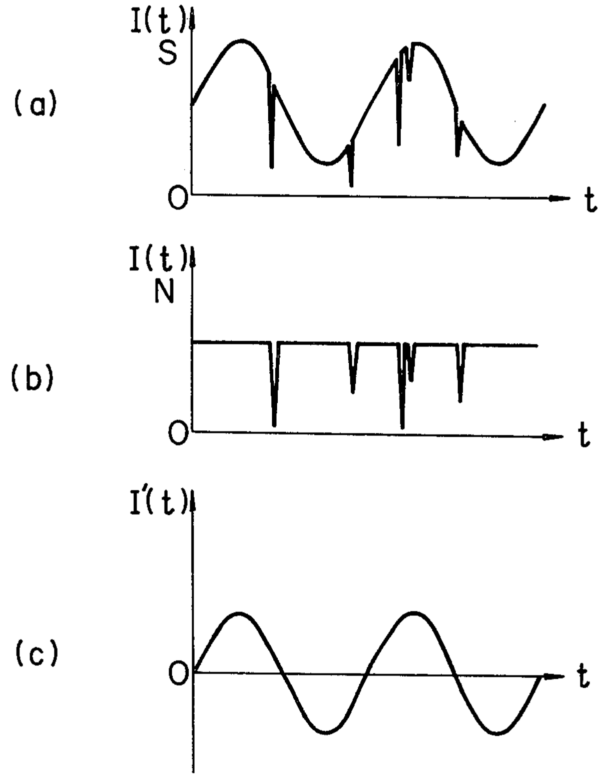

FIG. 5 is a block diagram of an embodiment of an apparatus for reproducing signals according to this invention, FIGS. 6 and 7 are graphs for explaining the signal processing according to this invention, FIG. 8 is a block diagram of another embodiment of an apparatus for recording signals according to this invention, FIG. 9 is a block diagram of another embodiment of an apparatus for reproducing signals according to this invention, and FIGS. 10 (*a*), (*b*) and (*c*) are graphs for explaining the signal processing in the embodiment of FIG. 9.

Recently, the hologram process has been developed as a powerful one for recording and reproducing video information or the like, in which a two-dimensional grating is usually employed as a carrier so as to be modulated in phase and amplitude for hologram recording. On the other hand, it is possible by employing a unidimensional grating as a carrier to record and reproduce temporally changing unidimensional information such as image signals. FIG. 1 is a block diagram showing a signal recording system in which a unidimensional grating is modulated in amplitude by a time series signal $I(t)$ for successive recording on a film. In FIG. 1, 1 is a source of coherent light such as laser light, 2 and 3 are collimator means for obtaining a predetermined parallel flux of light, 4 is a beamsplitter, 5 is a light modulator for amplitude-modulating a flux of coherent light by a signal $I(t)$ from a time series signal source 6, and 7 is a reflecting mirror which is adjusted so that the flux of coherent light and the reference flux light coming through the beamsplitter 4 are superposed at a predetermined angle on a film tape of photosensitive recording medium 9. 8 is a slit which has a width of $\delta$and is arranged in such a manner that the grating pattern modulated by the signal is successively recorded as a substantially unidimensional grating through the slit as the film tape 9 is fed at a definite speed $v(t)$. That is, the signal $I(t)$ is converted into the diffraction efficiency of a unidimensional grating to be successively recorded. The signal may be reproduced by feeding the recorded tape at a definite speed, illuminating the tape by a coherent flux of light and converting photoelectrically part of the resulting light diffracted through the grating.

The above-mentioned recording process of a time series signal is suitable for mass production in that cheaper materials such as a vinyl tape and the like may be used and the reprinting process may consist of, for example, transferring a pattern having a rough surface by pressing and heating.

When, however, a signal is reproduced from diffracted light in an optical system as described above, disadvantageously, since the flux of diffracted light is at most about 30% of that of the original light in intensity, the level of the reproduced signal is low, that is, a low S/N ratio (signal to noise ratio) results, and further the slit, light modulator or the like may bring about troubles to some extent. Still further, cutts and adsorbed dust on the film tape cause the diffracted light to be changed in intensity, as a result, it is inevitable for some noises to be produced.

This invention aims at eliminating the above-described disadvantages and, in the following, the principle of this invention will be described with respect to embodiments of this invention in conjunction with the accompanying drawings.

FIG. 2 is an embodiment of this invention [illegible], hereinafter, same numerals as in FIG. 1 are employed in FIG. 2 for indicating the common elements.

In FIG. 2, numeral 1 is a source of linearly polarized coherent light, 2 and 3 are collimator means, 4 is a beamsplitter, 5 is an electro-optical crystal such as $LiNbO_3$ or the like whose plane of polarization rotates with electric field, 6 is a signal source, 7' is another beamsplitter, 7'' is a reflecting mirror, 10 and 11 are analyzers. The optical system as illustrated in FIG. 2 is adjusted in such a manner that the reference light flux and the two modulated light fluxes are superposed on each other at respectively predetermined angles on a photosensitive recording medium 9 resulting in forming a grating-like pattern having a definite pitch.

In FIG. 3, the arrangement of the analyzers 10 and 11 with respect to the electric field vector of incident light is shown in which the respective rotation angles $\theta_1$ and $\theta_2$ are adjusted in such a manner that the light fluxes corresponding to $\theta_1$ and $\theta_2$ change their intensities in an opposite or complementary relationship. In FIG. 4, the relation between the light outputs of the analyzers 10 and 11 is shown for a sinusoidal signal in which $v(t)$ is the output of a signal source and $I(t)$ and $I'(t)$ are the output light intensities of the analyzers 10 and 11 respectively. Then, an adjustment is made so that any half-cycle of the signal source voltage $v(t)$ is included in the linear portion of the $v$ versus I characteristic curve of either one of the analyzers. 8 is a slit having a width δ and the grating pattern modulated by the signal is converted into the diffraction efficiency of a unidimensional grating to be successively recorded as the recording medium 9 is fed at a definite speed.

Next, the operation of reproduction will be described. In FIG. 5, 12 is a parallel flux of light, 13 is a slit having a width of δ, 14 is a recording medium having a signal recorded thereon, 15 and 16 are diffracted fluxes of light, 17 and 18 are lens systems, 19 and 20 are photo-electric converting elements, 21 and 22 are clipper circuits, and 23 is a differential amplifier. The portions 15 and 16 of the flux diffracted by the recording medium 14 which has been modulated in its diffraction efficiency by $I(t)$ and $I'(t)$ are respectively incident through the lens systems 17 and 18 to the photo-electric converting elements 19 and 20 where their changes in light intensity are converted into electric signals. These signals are supplied to the clipper circuits 21 and 22 where their distorted half-cycles are removed, respectively, resulting in signals as shown in FIGS. 6 (*a*) and (*b*). Then, these signals (*a*) and (*b*) are supplied to the differential amplifier 23 where a signal as shown in FIG. 6 (*c*) is obtained. As a result, since modulation has been made linearly in every half cycle of the signals and the alternate half cycles are superposed to reproduce the original signal, the modulation sensitivity as well as the dynamic range are twice as wide as in the ·ior art. Accordingly, the output in reproduction increases by a factor of two and the S/N ratio is also largely improved. On the other hand, when the rotation angles of the analyzers $\theta_1$ and $\theta_2$ satisfy the condition $\theta_1 = \theta_2 = 45°$, the bias point of the light modulator lies at the center of the linear portion of the v versus I characteristic curve and, so long as the signal source voltage $v(t)$ is included within the linear portion, the output light intensities of the analyzers $I(t)$ and $I'(t)$ should be modulated with non-distorted sinusoidal waves, as a result, the output signals of the photo-electric converting elements in reproduction also be sinusoidal. Consequently, if, in this case, the outputs are directly fed to the differential amplifier not through the clipper circuits, the original signal may be obtained. Further, since the reproduced signals have not been clipped on the way and the reproduction is made from the same hologram surface, as shown in FIG. 7, even if the reproduced signals may have noises included owing to cutts and accumulated dust on the recording medium, the noises occur at the same place in both the reproduced signals and do not occur in the output of the differential amplifier due to cancellation therein. That is, the effect is obtained that recording is free from cutts and adsorbed dust on the recording medium while the dynamic range is the same as in the prior art.

In FIGS. 6 and 7, the levels $I_o$, $I'_o$, and $v_o$ represent reference values above the black, or zero light intensity, level and are functions of the light intensity of the unmodulated beam recorded on the photosensitive recording medium.

In FIG. 8, another embodiment of this invention is illustrated. In FIG. 8, 24 is a source of coherent light, 25 and 26 are collimator means for obtaining predetermined coherent light, 27 and 28 are beamsplitters, 29 is a time series signal source, 30 is a light modulator for amplitude-modulating a flux of coherent light by a signal from the time series signal source 29, and 31 is a reflecting mirror. The reflecting mirror 31 is adjusted in such a manner that the light passing through the beamsplitter 27, that passing through the light modulator 30 and that reflected from the reflecting mirror 31 are superposed on each other at respectively predetermined angles on a photosensitive recording medium 33 resulting in forming an interference fringe having a definite pitch. 32 is a slit having a width of δ and is arranged in such a manner that the grating pattern modulated by the signal is successively recorded as a substantially unidimensional grating through the slit as the recording medium 33 is fed at a definite speed.

Next, the operation of reproduction will be described. In FIG. 9, 34 is a parallel flux of light, 35 is a slit having a width of δ, 36 is a recording medium having a signal mutiple-recorded thereon by the above-described process, 37 to 39 are diffracted fluxes of light from the recorded medium, 40 and 40′ are lens systems, 41 and 41′ are photoelectric converting elements such as photo-diodes or the like, and 42 is a differential amplifier. Among the diffracted fluxes of light from the recording medium 36, the flux 38 modulated in diffraction efficiency by the recorded signal and the flux 39 being not modulated are respectively incident through the lens systems 40 and 40′ to the photo-electric converting elements 41 and 41′ where the fluxes are converted into electrical signals.

When cuts, adsorbed dust and the like are present on the recording medium, all the diffracted fluxes naturally include noise signals corresponding to these cuts, dust and the like.

Accordingly, the output signals of the photo-electric converting elements 41 and 41′ respectively take, assuming, for brevity, that the recorded signals are of single frequency, the wave forms as shown in FIGS. 10 (*a*) and (*b*) each consisting of the signal with noises superposed thereupon. The respective values of the two output signals which correspond to the same portion of the recording medium are applied to the differential amplifier the output of which is the difference of the two signals. As a result, a signal which is free from the noises and has fidelity to the original signal as shown in FIG. 10 (*c*) is obtained.

What is claimed is:

1. Apparatus for recording signals on and reproducing signals from an optical image recording medium, comprising:

means for generating a beam of coherent light for recording signals on said recording medium;

means located in the path of said coherent light beam for splitting said beam into primary and secondary beams and for directing said primary beam onto said recording medium;

means for generating a time-series electrical signal;

electro-optical means coupled to the output of said time-series signal generating means and located in the path of said secondary beam for modulating said secondary beam as a function of said time-series signal;

further means located in the path of said secondary beam for splitting said modulated beam into first and second parts and for directing said first and second modulated beam parts onto said recording medium at predetermined angles with respect to each other and to said primary beam;

first and second analyzer located in the paths of said first and second modulated secondary beam parts, respectively, and having respective polarization angles $\theta_1$ and $\theta_2$ relative to the plane of polarization of said secondary beam;

means comprising a slit located in front of said recording medium through which said primary beam and said modulated secondary beam parts pass to produce an interference pattern on said recording medium between said primary beam and said modulated secondary beam parts after the latter have passed through said analyzers;

means for generating a reproducing beam of coherent light and projecting said producing beam onto said recording medium;

first and second photoelectric transducing means for detecting portions of the reproduced light beam corresponding to said recorded first and second secondary beam parts, respectively, and generating electrical signals corresponding to said detected beams; and means for combining the outputs of said photoelectric transducing means for reproducing said time-series signal from said recording medium.

2. The recording and reproducing apparatus according to claim 1, wherein said combining means comprises clipping circuits coupled to the outputs of said photoelectric transducing means and a differential amplifier coupled to the outputs of said clipping circuits.

3. The recording and reproducing apparatus according to claim 1, wherein said combining means comprises a differential amplifier coupled to said photoelectric transducing means.

4. The recording and reproducing apparatus according to claim 1, wherein said polarization angles $\theta_1$ and $\theta_2$ are approximately +45° and –45°, respectively, relative to the plane of polarization of said secondary beam.

* * * * *